UNITED STATES PATENT OFFICE.

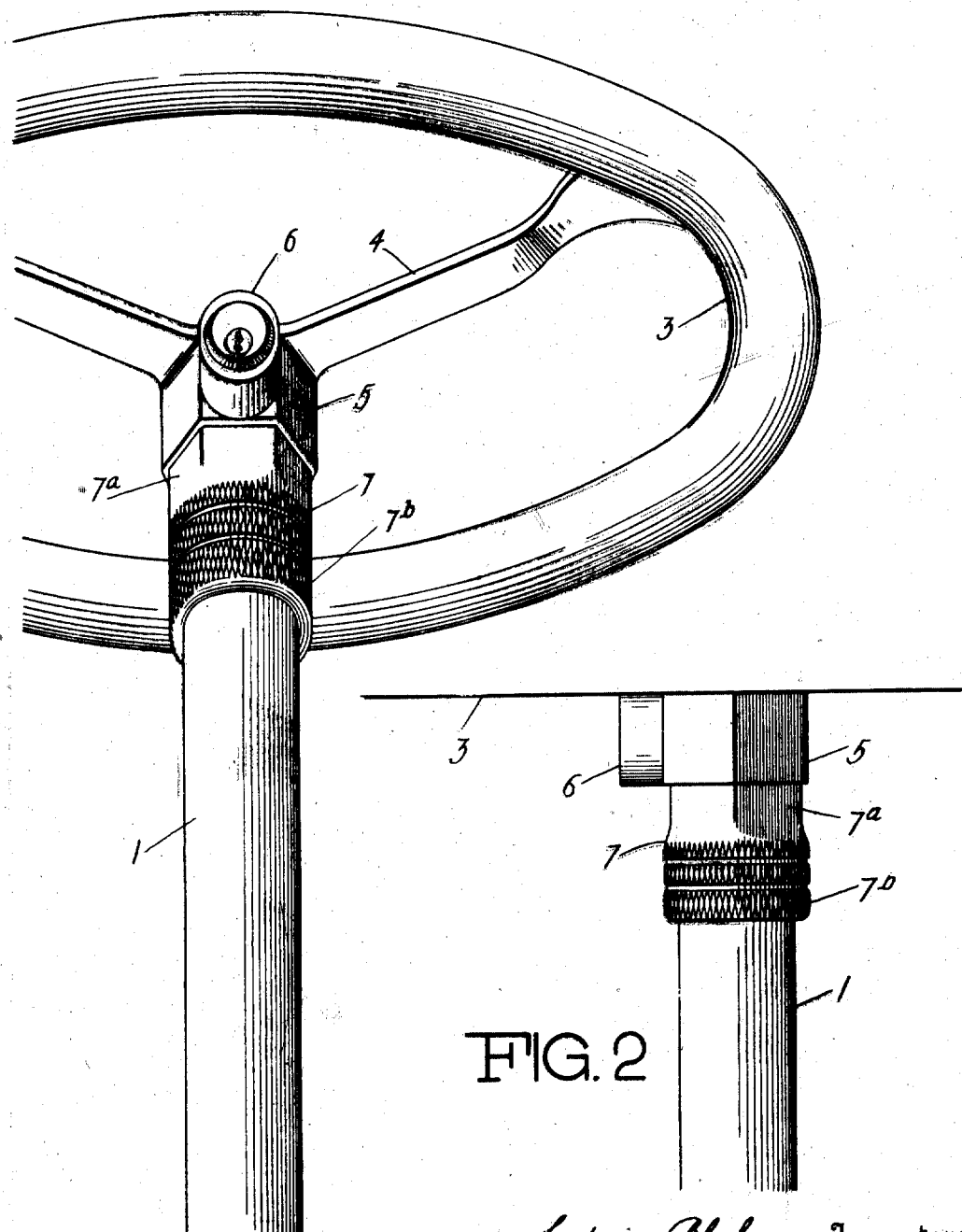

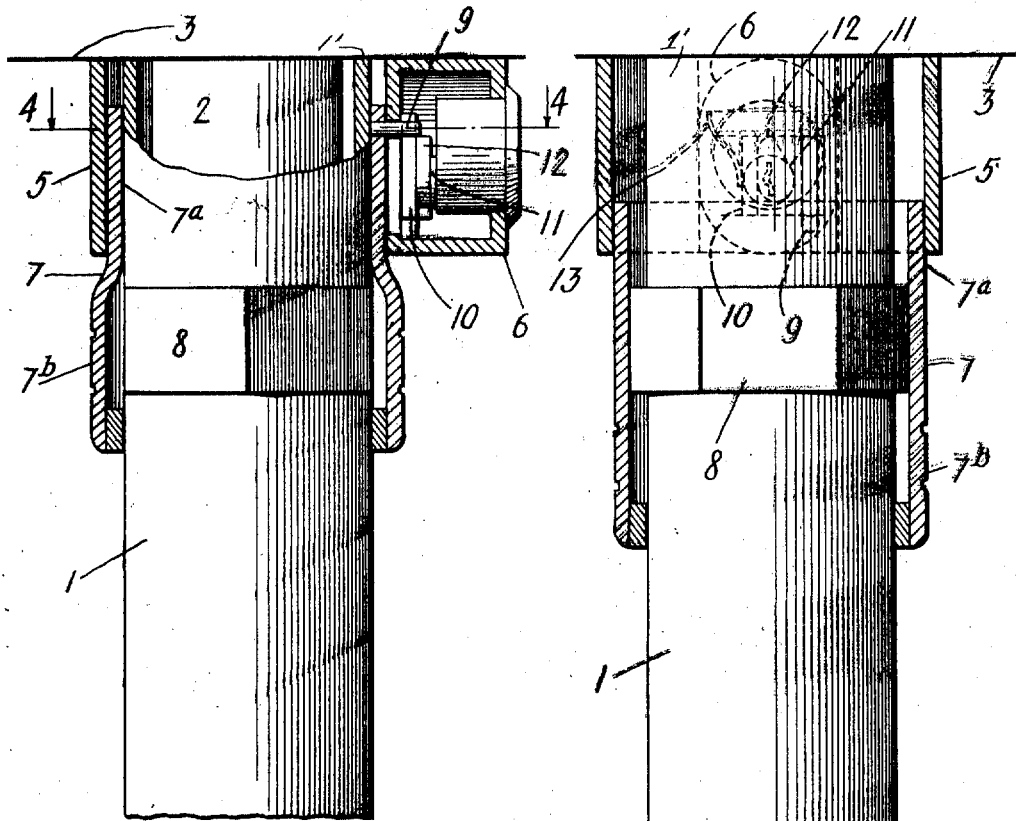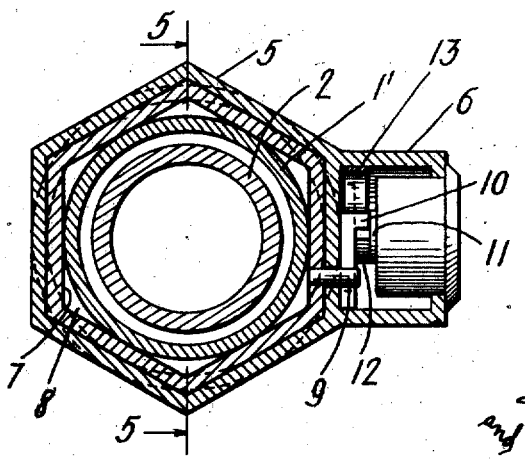

HUGO NEU, OF NEW YORK, N. Y., AND LUDWIG BLAHA, OF LYNDHURST, NEW JERSEY.

LOCK FOR AUTOMOBILE STEERING-WHEELS.

1,231,050.   Specification of Letters Patent.   Patented June 26, 1917.

Application filed March 9, 1917. Serial No. 153,656.

*To all whom it may concern:*

Be it known that we, HUGO NEU, a citizen of the United States, residing in the city, county, and State of New York, and LUDWIG BLAHA, a subject of the Emperor of Austria, residing at Lyndhurst, county of Hudson, and State of New Jersey, have invented certain new and useful Improvements in Locks for Automobile Steering-Wheels, of which the following is a specification.

This invention relates to a lock for automobile steering wheels for preventing the theft or tampering with the vehicle by unauthorized persons in the absence of the driver.

In a present form of locking devices to prevent the theft of an automobile, it is customary to lock the steering wheel against rotation. This type of device creates a fire hazard in that it prevents the movement or steering of an automobile in case of a fire in the immediate vicinity of where a car provided with this form of device has been left standing. This feature is such a menace to public safety that various cities and localities have enacted ordinances, etc., preventing the use of this kind of a device. It is one of the objects of this invention to render the steering apparatus of an automobile ineffective, but at the same time allowing the car to be guided in case of emergency.

Another object of the invention is the provision of a simple and efficient locking device permanently attached to the steering mechanism of an automobile and so arranged that by proper manipulation the steering wheel may be made to rotate independently of the rest of the steering apparatus.

Another object is the provision of a locking means which may be cheaply produced due to the fact that it is comprised of few and simple parts.

A further object of the invention is the production of an automobile lock, which may be easily installed upon either new or old cars. Most of the locking devices of this type on the market at the present time are so constructed as to require so many alterations of the steering apparatus before they can be installed as to substantially render such devices impractical.

A still further object is the provision of locking means for an automobile which is easily made operative, neat in appearance and which has its working parts completely inclosed so that they can be manipulated only by a person provided with a key.

Other objects of our invention will manifest themselves upon a reading of the following specification.

While this invention has been set forth in a certain preferred embodiment, it will be understood that modifications may be made without departing from the spirit and scope thereof.

Figure 1 is a perspective of our locking means applied to an automobile steering wheel.

Fig. 2 is a side elevation of the lock.

Fig. 3 is a view partly in section showing the position of parts when the steering wheel is free to rotate on the steering column.

Fig. 4 is a section taken on line 4—4 of Fig. 3; and

Fig. 5 is a view partly in section taken on line 5—5 of Fig. 4, showing the position of the parts when the steering wheel is locked to the steering column.

In the drawings there is shown a steering column 1 wherein is mounted a steering post 2, the latter of which carries at its upper end a steering wheel 3 provided with spokes or arms 4 centering in a hub 5, having a polygonally-shaped recessed portion. Formed integrally with or secured to the hub 4— such as by riveting, welding or the like, is a housing 6, which latter member is adapted to accommodate a locking means, such as a pin lock. A collar 7 is provided with an upper and a lower compartment 7ª and 7ᵇ, respectively, the upper compartment being complementary to the hub 5 and adapted to receive the same, while the lower compartment is circular in shape and adapted to house a polygonal nut 8 secured to the steering post 2. The polygonal nut 8 is of the same configuration as the interior upper part of the collar 7, and is positioned just above the end of the steering column which does not extend the full length of the steering post, but only sufficiently far so as to be in close proximity to, or abut against, the lower surface of the nut 8 and have its end inclosed by compartment 7ᵇ. A bushing or sleeve 1′ preferably having a diameter corresponding to that of the steering column 1, may be inserted between the upper surface of the nut 8 and the adjacent upper surface of the hub 5. This sleeve will lend rigidity to the adjacent parts and tend to eliminate any rattling thereof, which feature would be especially true if the sleeve 1' was formed integral with the hub 5, so as to constitute an interior depending portion thereof. Secured to the upper edge of the collar 7 is a pin 9 which projects into the housing 6 and is adapted to coöperate with certain elements contained therein. An L-shaped slide member 10 is adapted to coöperate with said pin and locks the collar 7 in a raised or lowered position depending whichever way the collar has been moved. The general features of the locking mechanism may comprise a lock of the ordinary type in which the tumblers thereof are adapted to be raised upon the insertion of the key in the key hole and includes a barrel 11 carrying at its extremity a cam member 12. The cam member 12 is adapted to move the L-shaped slide 10 against the tension of spring 13 in a horizontal plane, so that the end thereof in engagement with the pin 9 clears the latter, thus permitting the collar 7 to be moved in a vertical direction. Assuming that it is desired to free the steering wheel or disable the steering apparatus by inserting a key in the key hole and turning the same, the cam 12 will move the L-shaped slide member 10 in a horizontal direction (toward the left in Fig. 5), so that its lower end clears the pin 9 and by pushing upwardly on the collar 7 it may be moved upwardly a distance sufficient until the polygonal portion of the collar 7 disengages the nut 8 on the steering post, and the collar 7 be retained in its operated position due to the pin 9 riding on the upper surface of the slide member 10. (See Fig. 3). In this position the steering wheel 3 may be rotated independently of the rest of the steering apparatus and thus render it impossible to start the car from the driver's seat. However, it will be noted that no other part of the steering apparatus is disabled and by manipulating the front wheels by hand, the car may be pushed aside in case of an emergency, or when desired to move it a short distance.

When it is desired to fasten the steering wheel to the steering post, by means of the key the collar 7 may be lowered to the position shown in Fig. 5. In this position the polygonal portion of the collar 7 registers with the corresponding sides of the nut 8, thus securely fastening these two members together and locking the steering wheel to the steering post.

It will be noted that the lower edge of the collar 7 is spun over inwardly so as to bring it into engagement with the outer surface of the steering column 1, thereby preventing the entrance or insertion of foreign objects—such as dust or instruments intended to render ineffective the locking means. To afford an easy grip for the manipulation of the collar 7 its lower half is knurled.

From the above it is obvious that to use the locking means herein described all that is required on the part of the driver is to insert a key into the lock and move the collar 7 upwardly. This will effect the release of the steering wheel and render the steering apparatus ineffective. When desired to use the steering wheel for driving the car, all that is again required is to insert the key and move the collar downwardly into engagement with the hub on the steering wheel.

While we have herein shown and particularly described the preferred embodiment of our invention, we do not want to be limited to the precise details of construction illustrated, as changes may be readily made without departing from the spirit and scope of our invention.

Having thus described our invention, what we claim as new herein and desire to secure by Letters Patent is:—

1. In a locking means for steering wheels, an extension secured to the hub of a steering wheel and having a polygonally-shaped recess, a fixed member carried by the steering post and having an exterior complemental surface, and a sleeve slidably mounted and adapted to engage the fixed means on the steering post and fit into said recess, whereby said steering wheel is locked against independent rotation.

2. In a locking means for steering wheels, an extension secured to the hub of the steering wheel and having a polygonally-shaped recess, a nut secured to the steering post and having an exterior complemental surface, and a sleeve slidably mounted and adapted to have its exterior surface fit into said recess and its interior surface engaging the periphery of the nut secured to the steering post whereby said steering wheel is locked against independent rotation.

3. The combination with a steering post and a steering wheel, of a locking device including an extension having a compartment carried by the hub of the steering wheel, said compartment being adapted to accommodate a sleeve arranged to be slidably mounted on the steering post for movement to and from the steering wheel and adapted to be held against rotation on said steering post, the upper exterior surface of said sleeve being polygonally shaped and adapted to register with a complemental recess formed in said compartment, and locking means effective when said sleeve is moved away from the steering wheel, whereby said steering wheel is locked to the steering post.

4. In a locking means for steering wheels, an extension secured to the hub and having a polygonally-shaped recess, a polygonally-shaped nut carried by the steering post and a slidable member adapted to coöperate with said extension and said nut, said slidable member having a portion of its exterior surface complementally shaped and adapted to enter said recess and the interior surface of said portion being adapted to fit over said nut, the engaging surface of said portion depending upon the position of said slidable member.

HUGO NEU.
LUDWIG BLAHA.